Oct. 9, 1951     K. J. YOST     2,570,903
ARTICLE FEEDING MEANS
Filed Jan. 15, 1947     3 Sheets-Sheet 1

INVENTOR
KENNETH J. YOST
BY
ATTORNEY

INVENTOR
KENNETH J. YOST
BY
John H. Lewis Jr.
ATTORNEY

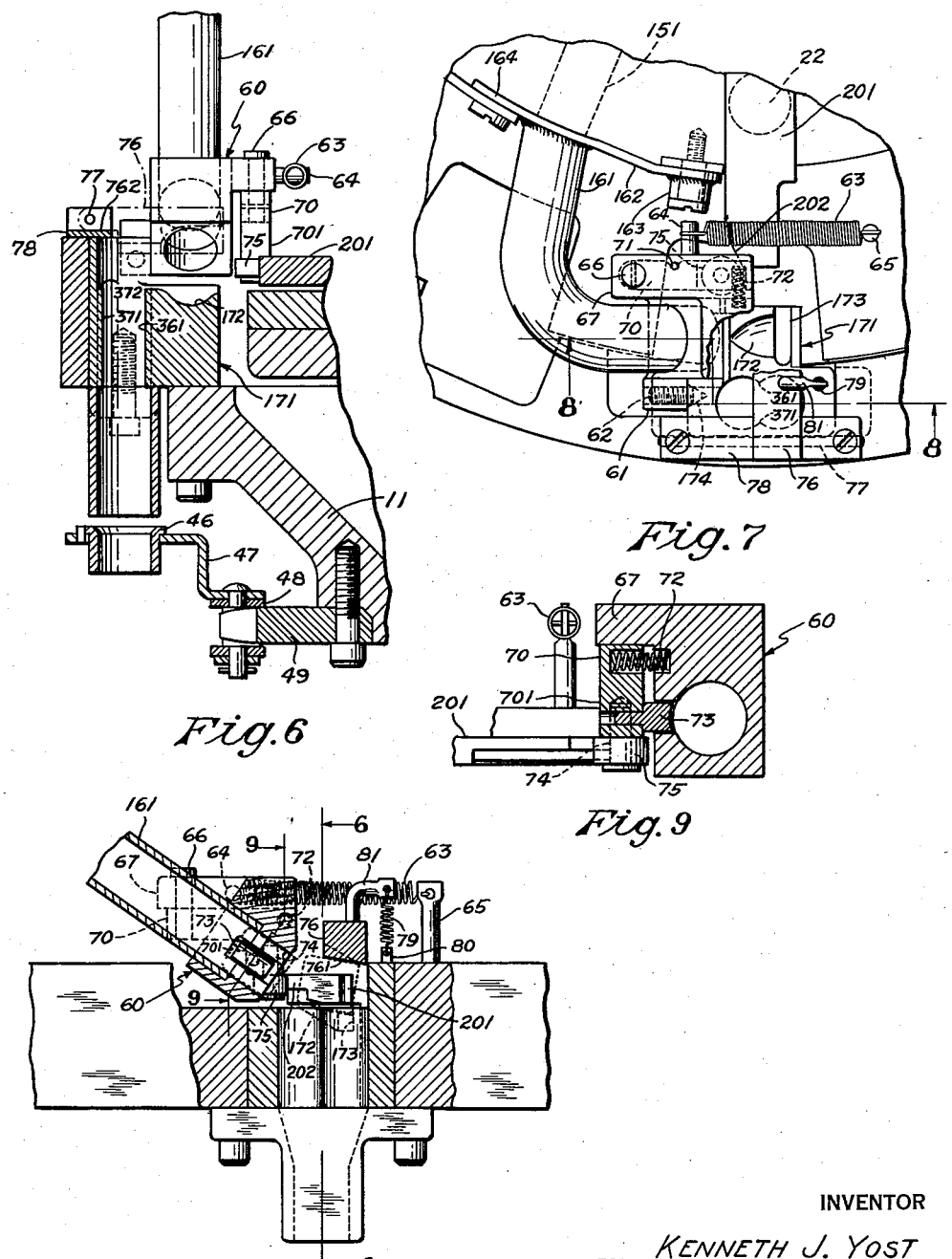

Patented Oct. 9, 1951

2,570,903

UNITED STATES PATENT OFFICE 2,570,903

ARTICLE FEEDING MEANS

Kenneth J. Yost, Westport, Conn., assignor to Remington Arms Company, Inc., Bridgeport, Conn., a corporation of Delaware Application January 15, 1947, Serial No. 722,251

10 Claims. (Cl. 198—33)

This invention relates to a device for removing workpieces from a hopper and delivering them to a machine or conveyor one at a time in order and in a predetermined position of orientation.

More specifically, the invention contemplates means for delivering cup-shaped and generally cylindrical workpieces mouth-up to a machine, or to a conveyor chain by which the workpieces are carried to a machine, designed to perform an operation upon the workpieces or to assemble with such pieces other elements delivered at subsequent stations.

In the drawings:

Fig. 6 is a fragmentary vertical section in substantially the same plane as Fig. 1 but showing a form of device adapted to handling elongated components.

Fig. 7 is a fragmentary plan view of the device shown in Fig. 6, certain parts being broken away for greater clearness.

Fig. 8 is a vertical sectional view, substantially on line 8—8 of Fig. 1, showing the pusher advanced and the workpiece in the feed block disengaged from the adjacent workpiece in the feed tube.

Fig. 9 is a fragmentary sectional view, substantially on line 9—9 of Fig. 8.

Figure 1:
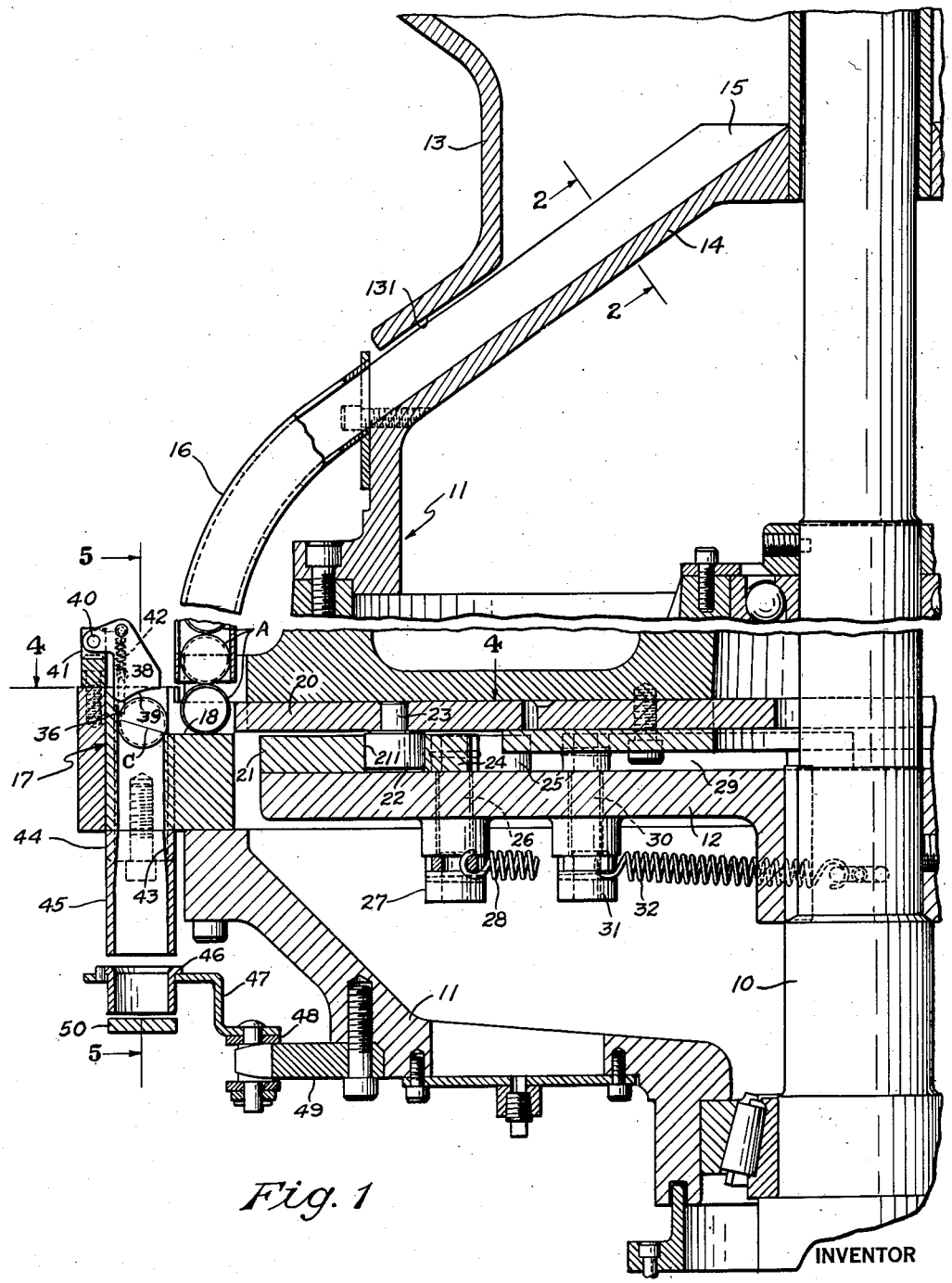
Fig. 1 is a fragmentary sectional elevation of one type of machine embodying the invention.

As illustrated in the drawings, and to be described herein, the invention is applied to the station of a continuously moving conveyor machine in which cylindrical cups are removed from a hopper in column arrangement, either end to, are turned to a mouth-up position, and delivered to suitable carriers in the conveyor chain by which they are moved to other stations for the performance of mechanical operations or assembly with other components. The chain loading station comprises a turret which is rotated by the conveyor chain, which chain moves in a suitable arc about the turret. With a fixed body hopper there is associated a revolving hopper bottom provided with a plurality of component delivery devices. The present machine embodies sixteen (16) such delivery devices, but the particular number is not material. These delivery devices rotate in unison with the conveyor chain, affording an opportunity for component delivery into the chain receptacles while chain and turret are in continuous motion. In general throughout this specification, one component delivery device will be described, it being understood that such a unit is multiplied as many times as convenient or desirable within the space provided by practicable hopper and turret dimensions. It will be further understood that the component orienting device is not necessarily associated with a machine of this character but is equally applicable to any machine in which gravitationally asymmetric components in column, either end to, are oriented to a heavy end down position and sequentially delivered in such position.

Figure 2:
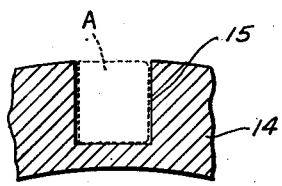
Fig. 2 is a detail section, substantially on the line 2—2 of Fig. 1, showing an element of the revolving hopper base adapted for the handling of cylindrical components of a length less than their diameter.
Figure 3:
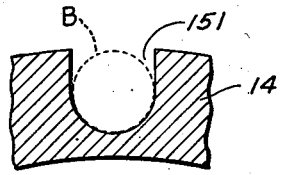
Fig. 3 is a detail section, similar to Fig. 2, showing a modification adapted for the handling of cylindrical components of a length greater than their diameter.
Figure 5:
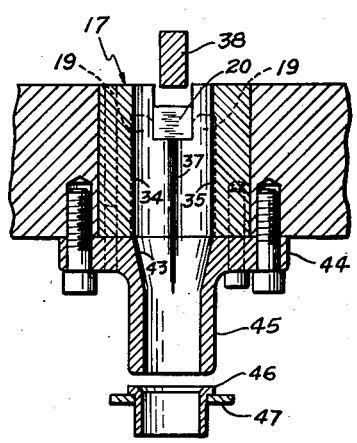
Fig. 5 is a vertical section on the line 5—5 of Fig. 1.

Referring now to the drawings, particularly Fig. 1, numeral 10 indicates a fixed column upon which there is mounted for rotation a turret frame identified generally by numeral 11, a fixed supporting plate 12, and a conical hopper body, a fragment of which is shown at 13. It will be noted that parts 10, 12 and 13 are fixed, while substantially all other parts to be described are associated and move with the revolving turret frame 11. Secured to turret frame 11 is a substantially conical revolving hopper bottom 14, having therein a plurality of radial grooves or troughs dimensioned to receive the components which are to be transferred from the hopper. Fig. 2 shows a section of a hopper bottom trough adapted for the reception of a cylindrical component or workpiece having a length which is less than its diameter. The groove 15 is of rectilinear configuration, and cylindrical workpieces are received therein in side-by-side relation as shown by the dotted outline A. Fig. 3 illustrates a hopper groove 151 adapted to receive cylindrical pieces having a length greater than their diameter, such pieces being received in end-to-end relation and lying in the groove in the manner shown by dotted outline B. It will be understood that, in order to secure a column arrangement of the workpieces in the grooves, the transverse dimension of the grooves is determined with reference to the smallest dimension of the article. Pieces having a length less than their diameter lie in side-by-side relation, and pieces having a length greater than their diameter lie in end-to-end relation. The hopper bottom grooves are of such depth as to completely contain the articles, enabling them to pass under the adjacent surface 131 of the fixed hopper body 13.

Secured to the revolving turret frame 11, in position to communicate respectively with each of the hopper bottom grooves 15 or 151, are a plurality of delivery tubes 16 through which the workpieces drop by gravity into position for delivery to the orienting device. The means for delivering workpieces one at a time from tube 16 to the orientator varies in construction according to the proportions of the workpiece. The delivery device for short workpeices, that is, those having a length less than their diameter, will first be described.

Figure 4:
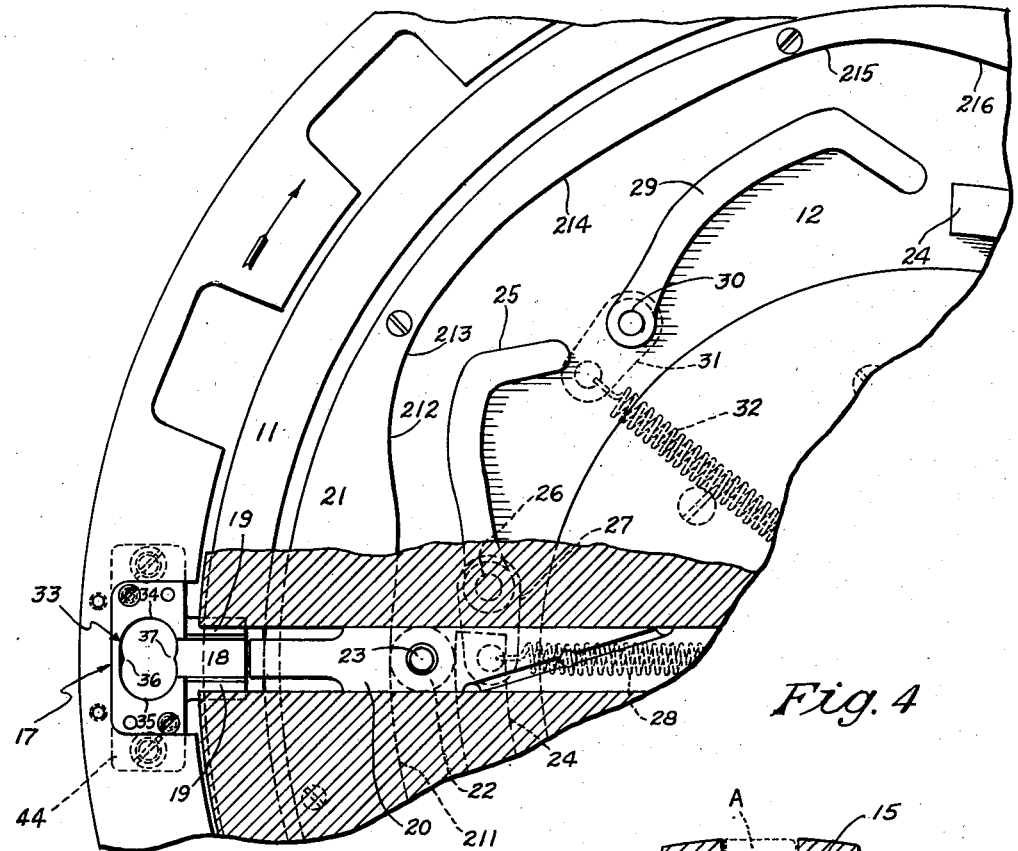
Fig. 4 is a fragmentary horizontal section, substantially on the line 4—4 of Fig. 1.

The lower reach of the tube 16 containing short workpieces is disposed substantially vertically and the workpieces lie therein in side-by-side relation. The lower end of tube 16 is suitably secured to an orienting block identified generally by numeral 17, and the lowermost workpiece in the tube rests upon an upwardly facing surface 18 which may be a part of the orienting block. Side bars or ramps 19 (Fig. 4), extending upwardly beyond supporting surface 18, form lateral guides which prevent endwise displacement of the lowermost workpiece out of its position in the column of pieces in tube 16. The lowermost workpiece in the position just described is thrust laterally and outwardly into the orienting portion of the block 17 by means of a pusher 20 actuated by suitable cams which are associated with the fixed plate 12. It will be understood that there is one pusher and one orienting block and related parts associated with each of the plurality of delivery tubes 16 and that each of the pushers in turn is actuated by the relatively fixed cam devices, to be described, to effect the transfer of components from each of the delivery tubes to the associated orienting block at the desired position in the revolution of turret 11.

Secured to the marginal portion of the fixed plate 12 is a generally ring-shaped member 21 (see Figs. 1 and 4), the inner periphery of which constitutes a cam surface which is engaged by the cam following roller 22 rotatably mounted on a stud 23 depending from the pusher 20. The inner marginal surface 211 of the cam member 21 is throughout the greater part of its length a circular arc so positioned as to hold the pusher in retracted position. Adjacent the point of delivery, the surface 211 is curved outwardly in a suitable manner, as shown at 212, permitting an outward movement of the pusher, to effect delivery of a component substantially at the point 213. Adjacent and beyond the point 213, the cam surface is inclined inwardly, as shown at 214, to effect a slight retraction of the pusher. Thereafter, the cam surface again retires outwardly, to the point 215, to enable a supplemental pusher advance. Beyond the point 215 and along the surface 216, the pusher is again retired, to traverse the arcuate surface 211. An inner guide for the cam following roller 22, while traversing the arcuate surface 211, is supplied by an acruate rib 24 secured to the plate 12, which rib terminates adjacent the ends of the active surfaces 212 and 216 of the ring 21 above described. Actual outward movement of the pusher is effected by the engagement of roller 22 with a lever-like cam member 25 secured to an arbor 26 journalled in the plate 12 and having secured at its lower end a short arm 27 at the free end of which is attached a spring 28. The opposite end of spring 28 is supported from the fixed column 10. This spring mounting of the pusher advancing member or lever 25 enables this lever to yield in the event advance movement of the pusher is blocked by a jam in the orienting block or otherwise. Having traversed the lever 25, and thereby executed its component delivery movement, pusher 20 is slightly retired by engagement with surface 214 and at this time is not restrained from inward movement, such restraint having been found unnecessary, due to the fact that centrifugal force holds the roller 22 in engagement with the surface 214. Having been slightly retracted by surface 214, the pusher is again advanced by engagement with a second lever mounted cam 29, the purpose of this supplemental pusher advance being to effect the dislodgment of a workpiece which may have been wedged and temporarily lodged in the top of the orienting block to be presently described. The control of cam lever 29 is similar to that of lever 25, said lever 29 being secured to the top of an arbor 30 mounted in the plate 12 and having at its lower end an arm 31 to which is attached a spring 32, the opposite end of which is supported from the column 10.

Each workpiece delivered by a pusher 20 in the manner above described traverses the supporting surface 18 and enters the orienting aperture in block 17. This aperture is shown in plan in Fig. 4 and identified generally by numeral 33. It extends vertically through block 17 and is formed by the intersection of two cylindrical bores and thus comprises two symmetrical halves, each consisting of a circular arc 34 and 35, which arcs join in the cusps 36 and 37, located opposite the center of the guide track formed by support 18 and side ramps 19. For the orienting of short components, the cusp 36 preferably extends far enough above surface 18 to be frontally engaged by a workpiece, while the cusp 37 terminates in the plane of the surface 18. A workpiece moving through the guide track thus slides and falls over the top of cusp 37, being engaged by this cusp at its longitudinal dimensional center and otherwise vertically unsupported until it drops against the cusp 36, by which it is engaged at another point in its longitudinal dimensional center. The piece being gravitationally asymmetric, due to the fact that one end is closed and the other open, will rotate about the axis C defined by its points of contact with cusps 37 and 36. It will be noted that this axis is substantially above the lower arc of the workpiece and that such displacement of the axis of rotation from the periphery of the workpiece greatly facilitates the desired rotation about axis C. The diameters of the bores 34 and 35 are only slightly greater than the diameter of the cylindrical workpieces, thus, any movement of the workpiece other than the desired rotation into one of the bores 34 or 35 is prevented.

Any tendency of the workpiece toward upward displacement as it is advanced by pusher 20 is prevented by a guide piece or cover 38 which has a curved workpiece engaging face 39; is pivoted at 40 in supports 41 extending upwardly from block 17, and is urged downwardly by suitable springs, such as 42. The dimensioning of the parts is such that cover 38 is only slightly displaced by the advance of each component but springs 42 are sufficiently strong to prevent the premature movement of a component into the orienting aperture by centrifugal force. The bores 34 and 35 of the orienting block communicate with a passage or throat 43 in a connecting block 44, in which passage the two separate bores are merged into a single passage of circular section and of a diameter substantially identical with that of the separate bores. The throat, in turn, communicates with a transversely circular tube 45 through which the components are dropped in turn into bushings or receptacles 46 carried in arms 47 secured to the conveyor chain 48. The spacing of receptacles 46 on chain 48 corresponds to the spacing of delivery tubes 45 and associated parts on the turret and, since the turret is rotated by the chain through the engagement thereof with sprocket 49 on turret 11, at the time of component delivery a receptacle 46 is aligned beneath each delivery tube 45 and these parts are moved in unison. A support 50 serves to retain the workpieces in bushings 46.

Figs. 6 to 9, inclusive, illustrate a modification of the apparatus above described adapted for the delivery and orientation of workpieces of a length greater than their diameter. As above noted, such workpieces are arranged in the hopper bottom grooves 151 in end-to-end relation and adjacent pieces tend to nest and interlock. For this reason it becomes necessary to separate each workpiece in turn from the column above it to enable unimpeded movement of such workpiece into the orienting block. As shown in Figs. 6 to 9, this is accomplished by shifting the entire workpiece delivery tube and its contents away from the orienting block and the workpiece therein. Secured to the upper end of the delivery tube 161 is a flange 162 formed in an arc to conform to the periphery of the hopper base and pivoted thereto at 163. The opposite end 164 of flange 162 has a bolt and slot connection with the hopper base which enables pivotal movement about 163. The lower end of tube 161 is turned laterally and approaches the orienting block at an appropriate inclination—say about 35° to the horizontal. To the lower end of tube 161 is secured a mounting block identified generally by numeral 60. The mounting block comprises an aperture aligned with tube 161 and is counterbored to receive the end portion of said tube. The workpiece receiving portion of the orienting block (identified generally by numeral 171) comprises an inclined and arcuate shelf 172 and a vertically extending ledge 173 adapted to support a workpiece in position for transfer into the orienting portion of block 171. A laterally extending portion 61 of mounting block 60 is apertured and threaded to receive a locating screw 62 which projects therethrough into a recess 174 in orienting block 171, thereby fully locating tube 161 and mounting block 60 with respect to the orienting block, these parts being held in normal position by a spring 63 tensioned between a stud 64 projecting inwardly from the mounting block and a post 65.

Pivoted on a stud 66 which projects downwardly from an overhanging portion 67 of mounting block 60 is an arm 70 spring-urged for counter-clockwise rotation (Fig. 7) against a stud 71 in part 67 by a spring 72 (Fig. 9) housed in matching recesses in arm 70 and block 60, respectively. Secured in a depending foot 701 of arm 70 is a shoe 73 which lies in an aperture in the side of block 60 and is adapted to be projected through such aperture into the workpiece passage through said block when arm 70 is displaced against the compression of spring 72 in the manner to be described. The end face of shoe 73 is formed in an arc of a radius substantially equal to the radius of the workpieces.

Secured in foot 701 is a vertical stud 74 which carries a cam following roller 75. The pusher 201 which effects the transfer of each workpiece in turn into the orienting block proper is generally similar to the pusher 20 above described and is similarly actuated and controlled. However, pusher 201 comprises an inclined face 202 adapted to engage roller 75. The functioning of this mechanism, although quite obvious, may be described as follows:

Tube 161 contains a column of workpieces, the lowermost being within the apertured mounting block 60, and this piece is supported by one which lies within the transfer portion of the orienting block upon shelf 172 and against ledge 173. As pusher 201 begins its advancing movement, it first engages roller 75, swinging arm 70 about pivot 66 and bringing shoe 73 into gripping engagement with the workpiece within the mounting block aperture. Such movement of the shoe 73 takes place first, spring 72 being substantially weaker than spring 63. Thereafter, as the roller 75 continues to ride along the cam face 202, mounting block and delivery tube and their contents are bodily shifted away from the component in the orienting block, pivoting about 163. Both these movements take place before the end of pusher 201 has engaged the side of the workpiece in the orienting block. Thereafter, the pusher engages such workpiece and transfers it into the orienting block in the manner heretofore described.

Undesired upward and outward movement of the workpiece in transit to the orienting block proper is prevented by a suitable cover 76 pivoted at 77 to a plate 78 associated with the orienting block and urged downwardly by suitable means such as spring 79 tensioned between a post 80 and an arm 81 extending upwardly and laterally from cover 76. The end portion of the workpiece engaging face 761 of cover 76 is inclined at substantially the same angle as the supporting shelf 172, and toward the hinge or pivot 77 this angle is diminished, so that as the workpiece in transfer approaches the orienting block it is brought to a substantially horizontal position, the supports for the workpiece being substantially similarly inclined. The clearance between said supports and surface 761 is such that as the workpiece drops into the orienting block, it is free rather than being positively urged downward by contact with cover surface 761. Downward movement of cover 76 under the urge of spring 79 is stopped by the engagement of surface 762 thereof with the top of plate 78. The orienting apertures, converging throat and delivery tube are substantially similar to those above described except that cusps 361 and 371 are somewhat higher due to the wider spacing of the arcuate apertures to accommodate longer workpieces, and cusps 371 may terminate in a ledge 372 horizontally opposite the top of cusp 361 so that each workpiece in turn is positioned on top of the two cusps instead of lying on top of one cusp and against the edge of the second, as described for short workpieces.

It will be obvious that, without departing from the invention, many variations may be made in the particular devices and mechanisms above described.

What is claimed is:

1. Apparatus for orienting gravimetrically asymmetric articles into uniform positions comprising an orienting block having therein spaced article supports, article feed means comprising a tubular member containing a column of articles, means comprising a reciprocating pusher for removing the lowermost article from said column and delivering said article to said spaced supports, and means for separating said lowermost article from said column of articles comprising a cam on said pusher and a cam follower on said tubular member.

2. Apparatus for orienting gravimetrically asymmetric articles into uniform positions comprising an orienting block having therein spaced article supports, article feed means comprising a tubular member containing a column of articles, means comprising a reciprocating pusher for removing the lowermost article from said column and delivering said article to said spaced supports, means for separating said lowermost article from said column of articles comprising a cam on said pusher and a cam follower on said tubular member, and a device associated with said cam follower adapted for gripping engagement with the article in said column adjacent said lowermost article.

3. Apparatus for orienting gravimetrically asymmetric articles into uniform positions comprising an orienting block having therein spaced article supports, article feed means comprising a tubular member containing a column of articles, means comprising a reciprocating pusher for removing the lowermost article from said column and delivering said article to said spaced supports, and means for separating said lowermost article from said column of articles comprising a cam on said pusher and a cam follower device pivoted on said tubular member and adapted for rotational displacement to grip the article adjacent said lowermost article and for bodily displacement to retract said tubular member.

4. Apparatus for orienting cylindrical gravimetrically asymmetric articles into uniform positions comprising an orienting block having therein a compound aperture comprised of two parallel intersecting cylindrical bores of equal radii not substantially greater than the radius of the articles being oriented, said compound aperture communicating with a cylindrical aperture through a throat merging at the top with said compound aperture and at the bottom with said cylindrical aperture.

5. Apparatus for the loading of workpieces into receptacles on a continuously moving conveyor chain in a predetermined position of orientation comprising a turret driven by said chain, a stationary hopper, and means for moving workpieces from said hopper to said chain receptacles comprising a hopper bottom rotating with said turret and having radial workpiece receiving grooves therein, a plurality of tubes communicating with said grooves and adapted to convey workpieces to a transfer point, a plurality of orienting blocks associated respectively with said tubes, a plurality of pushers adapted to transfer workpieces from said transfer point into said orienting blocks, and a single cam means common to and adapted for the successive actuation of said pushers.

6. Apparatus for orienting gravimetrically asymmetric articles into uniform positions comprising an orienting block having therein spaced upwardly facing article rotation controlling supports upon which an article rests while freely rotating without substantial translation about an axis determined by said supports, and passages for receiving and guiding articles after rotation upon said supports.

7. Apparatus for orienting cylindrical gravimetrically longitudinally asymmetric articles into uniform positions comprising an orienting block having therein upwardly facing spaced article supports adapted to engage articles presented thereto at spaced points and by such spaced engagement to determine an axis of free gravitational rotation which intersects the body of said article, means for presenting the longitudinal dimensional centers of articles to said supports, and passages for receiving articles oriented on said supports.

8. Apparatus for orienting cylindrical gravimetrically longitudinally asymmetric articles into uniform positions comprising an orienting block having therein a passage for receiving and guiding oriented articles, said passage being bounded by two intersecting cylindrical surfaces of radii not substantially greater than the radius of the articles being oriented, at least one of the cusps formed by the intersection of said cylindrical surfaces terminating in an upwardly facing substantially planar face which affords a support for each article in turn while said article is gravitationally rotated about said support and into said passage without substantial translation.

9. Apparatus for orienting cylindrical gravimetrically longitudinally asymmetric articles into uniform positions comprising an orienting block having therein a passage for receiving and guiding oriented articles, said passage being bounded by two intersecting cylindrical surfaces of radii not substantially greater than the radius of the articles being oriented, the top ends of the cusps formed by the intersection of said cylindrical surfaces affording a support for an article placed thereon and determining an axis of free gravitational rotation of such article.

10. Apparatus for orienting cylindrical gravimetrically longitudinally asymmetric articles into uniform positions comprising an orienting block having therein a passage for receiving and guiding oriented articles, said passage being bounded by two intersecting cylindrical surfaces of radii not substantially greater than the radius of the articles being oriented, at least one of the cusps formed by the intersection of said cylindrical surfaces terminating in an upwardly facing substantially planar face which affords a support for each article in turn while said article is gravitationally rotated about said support and into said passage without substantial translation, and means for delivering articles one at a time to said supports in dimensionally longitudinally centered relation thereto.

KENNETH J. YOST.

REFERENCES CITED

The following references are of record in the file of this patent:

UNITED STATES PATENTS

| Number | Name | Date |
|---|---|---|
| 133,066 | Stetson | Nov. 12, 1872 |
| 898,113 | Jones | Sept. 8, 1908 |
| 971,999 | Hodge | Oct. 4, 1910 |
| 1,195,571 | Flaherty | Aug. 22, 1916 |
| 1,275,581 | Macomber | Aug. 13, 1918 |
| 1,419,732 | Henninger | June 13, 1922 |
| 1,856,951 | Foerster | May 3, 1932 |
| 1,932,529 | Nagy | Oct. 31, 1933 |
| 2,137,173 | Malloy | Nov. 15, 1938 |
| 2,373,623 | Yost | Apr. 10, 1945 |